United States Patent
Englert

[19]

[11] Patent Number: 6,029,722

[45] Date of Patent: Feb. 29, 2000

[54] SHAPING MACHINE

[75] Inventor: Heinrich Englert, Lauda-Königshofen, Germany

[73] Assignee: Michael Weinig AG, Germany

[21] Appl. No.: 09/215,777

[22] Filed: Dec. 18, 1998

[30] Foreign Application Priority Data

Dec. 18, 1997 [DE] Germany ............................ 197 56 280

[51] Int. Cl.$^7$ ................................ B27B 1/00; B27L 7/00; B27C 1/00; B27C 5/00

[52] U.S. Cl. ...................... 144/382; 144/3.1; 144/114.1; 144/116; 144/117.1; 144/134.1; 144/248.4; 144/357; 144/367; 144/369; 144/130

[58] Field of Search .............................. 144/1.1, 2.1, 3.1, 144/114.1, 116, 117.1, 133.1, 134.1, 135.2, 242.1, 245.1, 248.4, 248.8, 367, 369, 363, 356, 357, 382, 130

[56] References Cited

U.S. PATENT DOCUMENTS

| | | | |
|---|---|---|---|
| 4,422,486 | 12/1983 | Maret .................................... | 144/117.1 |
| 4,427,042 | 1/1984 | Mitchell et al. ..................... | 144/117.1 |
| 4,660,609 | 4/1987 | Miller, Jr. ............................ | 144/117.1 |
| 4,842,029 | 6/1989 | De Abreu ............................ | 144/117.1 |
| 4,932,448 | 6/1990 | Maioli et al. ........................ | 144/117.1 |

FOREIGN PATENT DOCUMENTS

| | | |
|---|---|---|
| 844966 | 11/1951 | Germany . |
| 19600239 | 4/1997 | Germany . |

*Primary Examiner*—W. Donald Bray
*Attorney, Agent, or Firm*—Robert W. Becker & Associates

[57] ABSTRACT

A shaping machine has at least one rotatably driven spindle having a conical receiving opening. A tool is provided. A conical member is mounted in the receiving opening, wherein the tool is secured by the conical member to the spindle. A clamping device clamps the conical member in the receiving opening, wherein the tool is supported on an end face of the spindle.

15 Claims, 3 Drawing Sheets

SHAPING MACHINE

BACKGROUND OF THE INVENTION

The present invention relates to a shaping or molding machine with at least one rotatably driven spindle that can be coupled with a tool.

Shaping machines have a plurality of spindles which are each provided with a tool for machining workpieces of wood, plastic etc. The workpieces are guided past the spindles so that the tools will machine the workpieces. It is frequently necessary to exchange the tools in order to employ, for example, special profiled blades or tools of different widths. The tools are seated on spindle journals and are axially secured on the spindle journal with clamping nuts. These spindle journals must be released, the tool must be removed, the new tool must be placed onto the spindle journal, and the clamping or spindle nut must be tightened. This requires accordingly long retooling times.

It is therefore an object of the present invention to embody the aforementioned shaping machines such that the tools can be exchanged within a very short period of time.

SUMMARY OF THE INVENTION

According to the present invention, the spindle has a conical receiving element which receives a conical member for securing the tool which conical member is clamped by a clamping device in the receiving element, whereby the tool is supported at an end face of the spindle over a large surface area.

The spindle is embodied as a hollow shaft having a conical receiving element for the conical member. Within the spindle the clamping device is provided with which the conical member is pulled into the conical receiving element of the spindle. For the purpose of exchanging the tool, it is only necessary to remove the tool from the spindle journal. The conical member may be a part of the tool or of the spindle journal on which the tool to be mounted on the shaping machine is positioned. Accordingly, the tool exchange is very simple, especially since the actual exchange process takes only a minimal amount of time. The tool itself is supported by a large surface area at the end face of the spindle so that a proper alignment of the tool with respect to the axis of the spindle is ensured. Furthermore, a high stiffness of the tool/spindle arrangement and thus a high manufacturing quality can be achieved.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 6.

Figure 1:
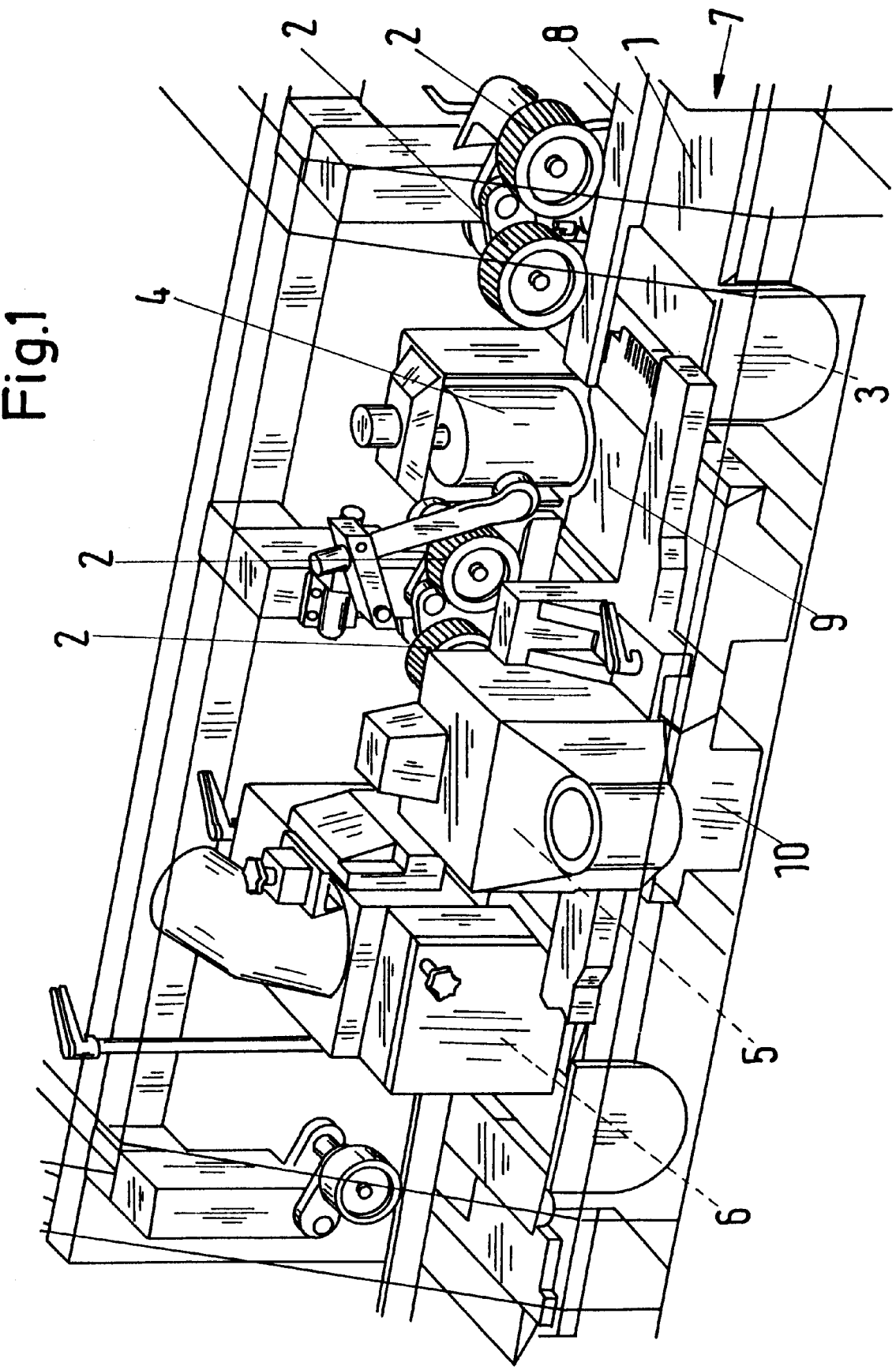
FIG. 1 shows a schematic and perspective view of the inventive shaping machine.

The machine represented in FIG. 1 is a shaping or molding machine which is used for machining workpieces of wood, plastic etc. The basic design of a shaping machine is known and will not be disclosed in detail in this context. The shaping machine has a transport path 1 on which the workpieces to be machined are transported. For transporting the workpieces, transport rollers 2, known from the prior art, are provided which support the workpieces and which are driven in rotation. The transport rollers feed the workpieces in a manner known in the prior art to tools 3 through 6 with which the workpieces are to be machined in a manner to be disclosed in the following.

The tool 3 is positioned in the area below the transport path 1 and is seated on a horizontal spindle that is driven in rotation. The tool 3 machines the underside of the workpiece during its passage through the shaping machine. The transport path 1 is interrupted in the area of the tool 3 so that the blade of the tool can reach the underside of the workpiece.

In the transporting direction 7 a tool 4 is arranged at a spacing downstream of the tool 3 and is rotatable about a vertical axis. It is positioned, when viewed in the transporting direction 7, on the right side of the transport path 1. The tool 4, seated fixedly on a vertical spindle, is used to machine the right longitudinal side of the workpiece in the transporting direction 7. In order to properly align the workpieces during transport through the shaping machine relative to the tools 3 through 6, the workpieces rest during their transport with their right longitudinal side on an abutment 8 that is interrupted in the area of the tool 4 to allow access of the tool to the workpiece side to be machined.

The tool 4 is positioned on a transverse slide 9 which extends preferably perpendicularly to the transport direction 7 of the workpieces. The transverse slide 9 can be used to move the tool 4 in the transverse direction, i.e., preferably perpendicularly to the transport direction 7.

In the transporting direction 7 downstream of the tool 4 a tool 5 is positioned which, when viewed in the transporting direction 7, is positioned on the left side of the workpiece to be machined. This tool 5 is fixedly connected to a vertical spindle. The tool 5 is supported together with its correlated spindle on a transverse slide 10 which can be moved transversely, preferably perpendicularly, to the transporting direction 7 of the workpieces. The two transverse slides 9, 10 are spaced a distance from one another. The top side of the transverse slides 9, 10 are positioned advantageously in a plane to the top side of the transport path 1 so that the workpieces upon transfer from the transport path 1 onto the transverse slides 9, 10 are fed without interruption. The top sides of the transverse slides 9, 10 may also be positioned lower than the transport path. In this case, separate table tops form the transport path 1 in this area.

In the transporting direction 7 downstream of the tool 5 a tool 6 is positioned which is fixedly secured on a horizontal spindle and is arranged in the area above the transport path 1. With the tool 6, the top side of the workpiece is machined, for example, planed. It is possible to arrange further tools in the transporting direction, for example, further lower spindles.

The shaping machine can perform different machining processes of the workpieces in a simple manner. When the tools 3 through 6 are adjusted according to FIG. 1, the workpieces which are transported in the transporting direction 7 along the abutment 8 are first planed by the tool 3 at their underside. Directly subsequent thereto the tool 4 in the transporting direction 7 planes the right longitudinal side of the workpiece. The tool 5 downstream in the transporting direction 7, then planes the left longitudinal side of the workpieces and thus determines the finished workpiece width. The subsequently arranged tool 6 then planes the top side of the workpiece and thus determines the thickness of the finished workpiece.

The tools 4, 5, 6 can also be provided as shaping tools, i.e., they are provided with shaping blades which provide the desired profiling. The corresponding sides of the workpiece are then accordingly profiled or contoured.

After passing through the shaping machine, the workpieces have been machined at the aforementioned locations. The workpieces are guided with minimal spacing in sequence along the different tools 3 through 6 which perform the corresponding machining steps at the workpiece.

Figure 2:
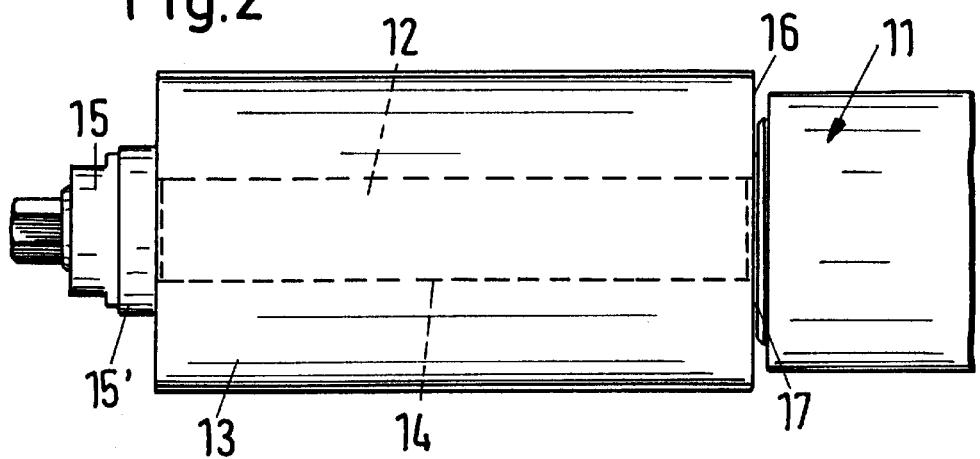
FIG. 2 shows on an enlarged scale and in a side view a conventional spindle supporting a tool.

In conventional shaping machines, the spindle 11, as represented, for example, in FIG. 2 comprises an axial spindle journal 12 that receives a tool 13. The tool has a through opening (through bore) 14 through which the spindle journal 12 extends. Onto the end of the spindle journal 12 projecting from the free end of the tool 13, a clamping nut 15 is threaded with which the tool 13 is clamped onto the spindle journal 12. The tool 13 is forced by the clamping nut 15 axially with its end face 16 onto the support collar 17. Between the clamping nut 15 and the tool 13 a securing or locking ring 15' is provided which prevents an accidental release of the clamping nut 15. Instead of the clamping nut 15 it is possible to fasten the tool 13 by a hydroclamping device on the spindle journal 12. In this case, the tool 13 is provided with at least one elastically widening bushing that is supplied with hydraulic pressure and clamps the tool 13 radially and centrally onto the spindle journal 12. In this case there is also a locking ring provided which prevents release of the tool 13 from the spindle journal 12 in case the hydraulic pressure will drop suddenly. These machine tools are constructively complicated and expensive.

Figure 3:
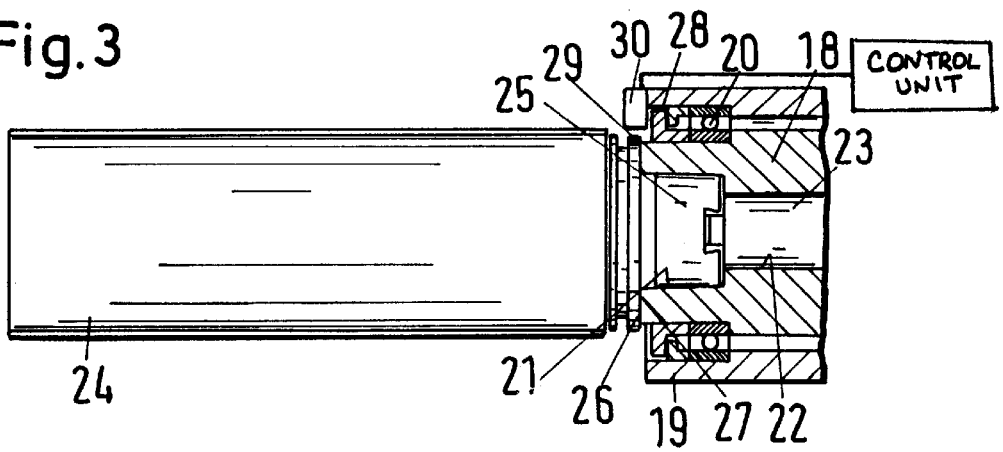
FIG. 3 shows in a side view and a part-sectional axial view a first embodiment of a spindle of the inventive shaping machine.
Figure 4:
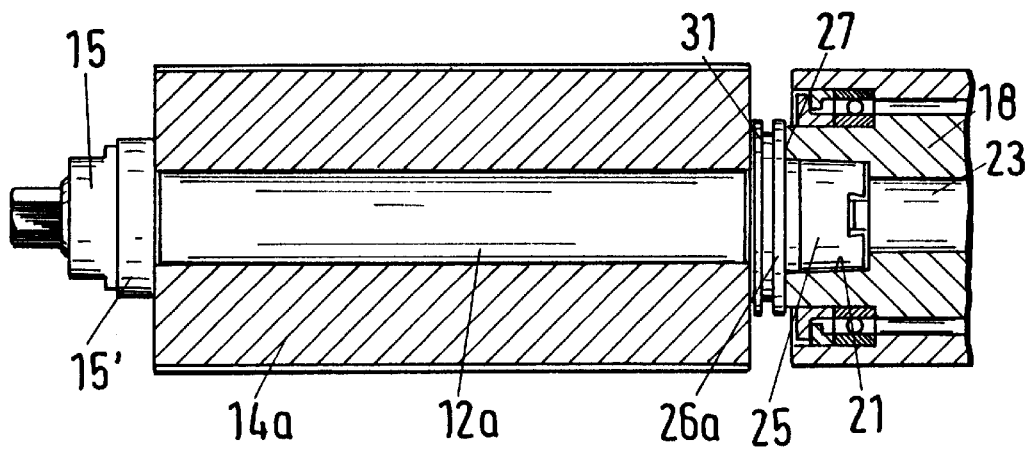
FIG. 4 shows an axial section of a further embodiment of the spindle.

The shaping machine according to FIG. 1 has spindles represented in FIGS. 3 and 4. In the embodiment according to FIG. 3, the spindle 18 is received in a spindle sleeve 19 that is stationarily secured within the machine. The spindle 18 is rotatably supported in the sleeve 19 by at least one bearing 20. The spindle 18 is a hollow spindle and has at its free end a conical receiving element 21, preferably a hollow shaft conical receiver (HSK receiver) which opens into an axial opening 22 penetrating the spindle 18 centrally. In the axial opening 22 a clamping device 23 is positioned which is known to a person skilled in the art and is therefore not disclosed in detail in this context. In the conical receiving element 21 a tool 24 with a corresponding conical member 25 is inserted. The clamping device 23 engages the conical member 25 and pulls it inwardly so that the tool 24 with its collar 26 will come to rest at the planar end face 27 of the spindle 18. At the same time, the tool 24 is reliably radially aligned relative to the spindle 18. In order to remove the tool 24 from the spindle 18, the clamping device 23 is moved in a manner known to a person skilled in the art axially in the direction of the tool 24. The conical member 25 of the tool 24 is embodied such that clamping elements of the clamping device 23 and elements for torque transmission can engage it. The actuation of the clamping device 23 can be performed manually or automatically by, for example, pneumatic or hydraulic clamping elements. Accordingly, an automatic tool exchange is easily possible.

The tool 24 has a very compact design. Especially a through opening (through bore) for a spindle journal is not required. Thus, the tool 24 can have a very small diameter.

The tool 24 can thus be operated at substantially higher rpm (revolutions per minute) as prior art tools according to FIG. 2. Since the tool 24 rests with its collar 26 at the end face 27 of the spindle 28 and is at the same time centered by the conical structure, the tool 24 even at high rpm will not wobble and is very stiffly connected to the spindle. The conical member 25 can be a monolithic (unitary) part of the tool 24 or can be detachably attached thereto.

The bearing 20 that is positioned at a spacing from the free end of the spindle sleeve 19 is sealed in the outward direction by at least one seal 28. At the collar 26 of the tool 24 a transponder 29 is arranged which has saved therein tool-specific data which can be detected by a reading head 30 provided at the spindle sleeve 19. The tool-specific data (tool specifications) can relate to the diameter and the length of the tool 24, the type of edges at the tool 24, the required position of the tool 24 within the shaping machine etc. Advantagouelsy, the data detected by the reading head 30 are transmitted to a computer or a control unit which, based on the detected tool-specific data, will adjust the shaping machine automatically, as is explained in an exemplary manner with the aid of FIG. 5. The arrangement of transponder and reading device can be selected in any other suitable manner.

FIG. 4 shows an alternative embodiment wherein a spindle journal 12a provided at one end with the conical member 25, preferably as a unitary or monolithic part, is positioned in the conical receiving element 21 of the spindle 18. Between the tool 14a and the conical member 25a collar 26a is provided which is preferably a unitary or monolithic part of the cone member 25. The tool 14a seated on the spindle journal 12a thus rest at the collar 26a and is forced by the tensioning forces of the clamping devices 23 against the end face 27 of the spindle 18.

The tool 14a rests at an abutment collar 31 which is positioned at a spacing opposite the collar 26a. The abutment collar 31 is advantageously also provided as a monolithic or unitary part of the conical member 25. The clamping nut 15 is threaded onto the end of the spindle journal 12a projecting from the tool 14a and, by interposition of the locking ring 15, fixedly presses the tool 14a against the abutment ring 31.

This embodiment is suitable for standard tools of the type used with conventional spindles 11 according to FIG. 2. The spindle journal 12a, in contrast to the known spindle embodiment according to FIG. 2, is provided with the conical member 25 at the end opposite the clamping nut 15. The conical member 25 is inserted into the conical receiving element 21 of the spindle 18 and clamped therein by the clamping device 23. The clamping device 23 is embodied in a manner known to a person skilled in the art so that the conical member 25 is not only pulled into the conical receiving element 21 but also fixedly connected to the spindle 18. In the embodiment according to FIG. 3, a fixed connection between the spindle 18 and the conical member 25 is also provided. The tool 14a according to FIG. 4 can also be exchanged in a very short period of time. It is not necessary to first remove a clamping nut 15 in order to be able to remove the tool from the spindle. Instead, the clamping device 23 is moved into the release position so that the tool 14a together with the spindle journal 12a is removed from the spindle 18. This exchange process can be performed fully automatically as in the previous embodiment.

In this embodiment, a transponder may also be provided at the collar 26a which has saved in its memory tool-specific data which can be detected or read by a reading device (head) and can be transferred to the control unit or computer of the shaping machine.

Figure 6:
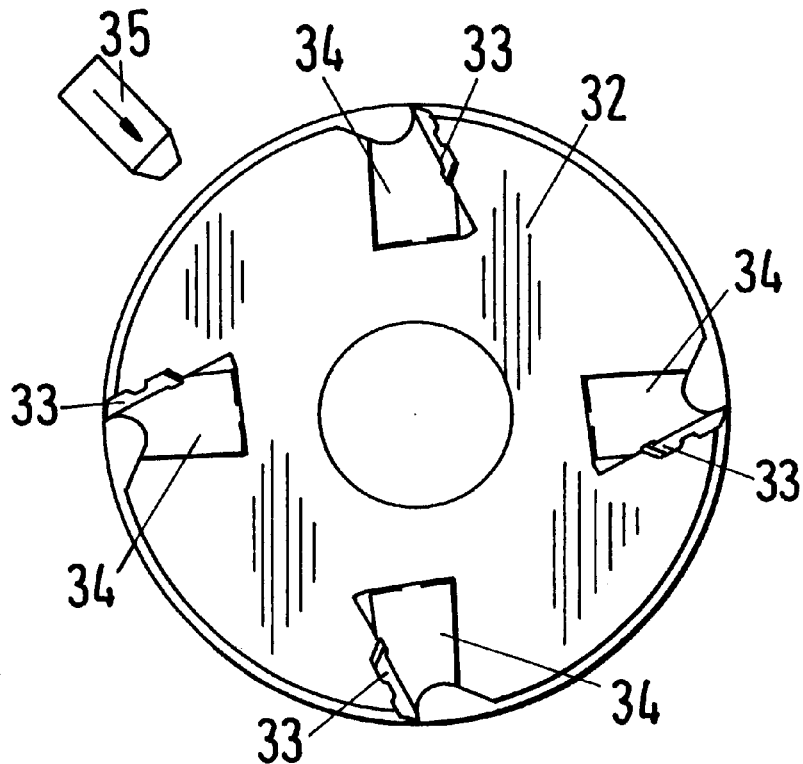
FIG. 6 shows in a schematic representation the process of dressing in the shaping machine.

By using the conical receiving element 21 according to the disclosed embodiments, a dressing or shaping ("jointing") is possible with the shaping machine. FIG. 6 shows, for example, a tool 32 that has distributed over its circumference cutting blades 33 having edges that are straight or profiled. The cutting blades 33 are clamped in the tool 32 in a manner known to a person skilled in the art by clamping elements 34. In order to dress or sharpen the cutting blades 33 so as to describe identical circles upon rotation, a sharpening device 35 is provided that is adjusted relative to the tool 32 such that when the tool 32 rotates the cutting blades 33 with their edges will come into contact with the sharpening tool 35 and are thus dressed or sharpened. When the edges of the cutting elements 33 are straight, the sharpening device 35 is axially moved during the sharpening process so that the edges of the cutting blades 33 are sharpened or dressed over their entire length.

When the cutting blades 33 are profiled blades, the sharpening tool 35 has a matching counter profile. In this case, the sharpening tool is only radially advanced whereby the edges of the cutting blades 33 of the rotating tool 32 will contact the counter profile of the sharpening tool 35 so that the edges are accordingly dressed or sharpened.

In order to be able to employ this sharpening process in practice, it is necessary that the tools are already precut with very precise true running on a grinding machine and are inserted with very great precision in regard to centering into the shaping machine. This has been possible in the past only by using the aforedescribed hydroclamping device because the tools are centrally clamped by radial clamping in the grinding machine as well as in the shaping machine. With axially clamped standard tools, on the other hand, the spindle journal and the bore must have a certain play. This, however, does not allow for very great precision of true running, and dressing or sharpening with conventional spindles is thus not suitable for practical applications.

However, when using the conical receiving element 21 of the present invention, a very high precision of true running is ensured so that it is now possible to also use standard tools for sharpening when it has been presharpened together with the spindle journal 12a in the grinding machine. Of course, the tool 24 according to FIG. 3 can thus also be used in this context.

Figure 5:
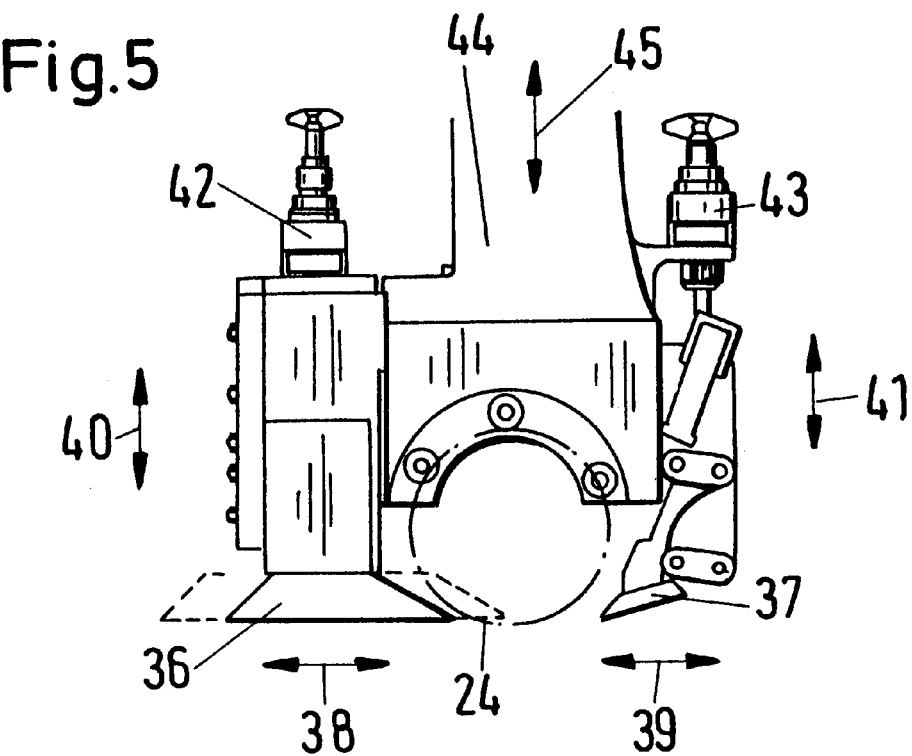
FIG. 5 shows an upper spindle with clamping elements for the shaping machine according to FIG. 1.

FIG. 5 shows in an exemplary manner with the aid of the upper spindle the possibility of automatically adjusting a suction hood as well as other pressing elements surrounding the tool by employing the data of the transponder 29 of the respective tool 24, 14a transmitted to the reading head 30. The tool is represented only by a dash-dotted line. Directly before and behind the tool 24 pressing elements 36, 37 are provided which must be positioned as closely as possible to the circle described by the tool 24 in order to provide for an excellent machining result. For this purpose, the pressing elements 36, 37 are adjustable in a direction transverse to the axis of the tool 24 in the direction of double arrows 38, 39. This adjustment can be performed manually by respectively arranged adjusting elements. Furthermore, it is possible to adjust the pressing elements 36, 37 perpendicularly to the adjusting directions 38, 39 in the direction of double arrows 40, 41. Accordingly, an optimal adjustment of the pressing elements 36, 37 to the diameter of different tools 24 is possible. For adjusting the pressing elements 36, 37, adjusting elements 42, 43 may be provided with which these adjustments can be manually performed. However, it is advantageous to carry out this adjustment automatically with respective motors. The pressing elements 36, 37 as well as the adjusting elements 42, 43 can be provided at a suction hood 44 which covers the tool 24 in the upward direction and via which the cuttings produced during machining of the workpieces are removed. The suction hood 44 is mounted, as is the spindle, on a non-represented slide which can be manually or advantageously automatically (by a motor) adjusted in the vertical direction 45 depending on which workpiece width is to be machined. The disclosed adjusting directions can also extend at a slant to the transporting direction of the workpieces.

The required adjustment and movement of the pressing elements 36, 37 and of the slide can be saved within the transponder 29. When a respective tool 24 is positioned in the spindle 18, the respective data are received by the reading head 30 and supplied to a control unit which then automatically provides for adjustment of the pressing elements 36, 37 and/or of the slide. It is also possible to display the detected data and to manually adjust the adjusting elements according to the displayed values.

When using profiled blades, the tool must be additionally axially moved. These adjusting values can also be saved within the transponder 29 and can be used for manual or automatic adjustment.

Of course, it is also possible to save within the transponder workpiece-specific data such as finished workpiece measurements, type of wood, required amount of wood, etc.

The same machine can also be used for other spindles, such as the right and/or left spindle.

The specification incorporates by reference the disclosure of German priority document 197 56 280.9 of Dec. 18, 1997.

The present invention is, of course, in no way restricted to the specific disclosure of the specification and drawings, but also encompasses any modifications within the scope of the appended claims.

What is claimed is:

1. A shaping machine comprising:
   at least one rotatably driven spindle (18);
   said spindle (18) having a conical receiving opening (21);
   a tool (14a, 24);
   a conical member (25) connected to said tool (14a, 24) and mounted in said receiving opening (21), wherein said tool (14a, 24) is secured by said conical member (25) to said spindle (18);
   a clamping device (23) clamping said conical member (25) in said receiving opening (21), wherein said tool (14a, 24) is supported on an end face (27) of said spindle (18).

2. A shaping machine according to claim 1, wherein said receiving opening (21) is a hollow shaft conical receiver.

3. A shaping machine according to claim 1, wherein said conical member (25) is a hollow shaft cone.

4. A shaping machine according to claim 1, wherein said conical member (25) is a part of said tool (14a, 24).

5. A shaping machine according to claim 4, wherein said conical member (25) and said tool (14a, 24) are a monolithic part.

6. A shaping machine according to claim 1, wherein:
   said spindle (18) has a spindle journal (12a):
   said conical member (25) is connected to said spindle journal (12a); and
   said tool (14a, 24) is seated in said spindle journal (12a).

7. A shaping machine according to claim 6, wherein said spindle journal (12a) has a collar (26, 26a) so that said tool (14a, 24) seated on said spindle journal (12a) is supported by said collar at said end face of said spindle (18).

8. A shaping machine according to claim 7, wherein said spindle journal (12a) and said collar (26) are a monolithic part.

9. A shaping machine according to claim 1, wherein said tool (24) has a collar (26) and wherein said collar (26) of said tool (24) rests on said end face of said spindle (18).

10. A shaping machine according to claim 9, wherein said tool (24) and said collar (26) are a monolithic part.

11. A shaping machine according to claim 1, further comprising a sleeve (19), wherein said spindle (18) is rotatably supported in said sleeve (19).

12. A shaping machine according to claim 1, further comprising a reading head (30) and a transponder (29), wherein said transponder (29) is mounted on said tool (14a, 24) and transmits tool specifications to said reading head (30).

13. A shaping machine according to claim 12, wherein said reading head (30) is mounted on said spindle (18).

14. A shaping machine according to claim 12, further comprising a control unit, wherein said reading head (30) is connected to said a control unit.

15. A shaping machine according to claim 1, wherein said tool (14a, 24) is designed for dressing.

\* \* \* \* \*

(12) REEXAMINATION CERTIFICATE (4641st)
United States Patent
Englert

(10) Number: US 6,029,722 C1
(45) Certificate Issued: Sep. 10, 2002

(54) SHAPING MACHINE

(75) Inventor: Heinrich Englert, Lauda-Königshofen (DE)

(73) Assignee: Michael Weinig Aktiengesellschaft, Tauberbischofsheim (DE)

Reexamination Request:
No. 90/006,030, Jun. 7, 2001

Reexamination Certificate for:
Patent No.: 6,029,722
Issued: Feb. 29, 2000
Appl. No.: 09/215,777
Filed: Dec. 18, 1998

(30) Foreign Application Priority Data

Dec. 18, 1997 (DE) ............................... 197 56 280

(51) Int. Cl.[7] ............... B23Q 15/00; B23Q 16/00; B27C 1/00; B27C 5/00; B27C 9/00
(52) U.S. Cl. ............. 144/382; 144/3.1; 144/114.1; 144/116; 144/117.1; 144/134.1; 144/130; 144/248.4; 144/357; 144/367; 144/369
(58) Field of Search ............. 144/114.1, 117.1, 144/130, 130.2, 134.1, 135.2

(56) References Cited

PUBLICATIONS

German DIN V 69063–6 Machine Tools, Seats for Hollow Taper Shanks Part 6: applies to configuration F of DIN 69893, Jan. 1996 (English Translation).
Dissertation by Deitrich Lembke, Rheinisch–Westfaelische Technische Hochschule, Aachen, 1993; excerpts from cover page to p. 1 pp 106/107, pp C6/C7, and appendix F10 (English Translation).
Periodical HK 10/95, pp 1256 "Hollow Shank Conical Interface for Rapidly Operating Milling Spindle" by U. Heisel PhD and J. Walz, Stuttgart (English Translation).
German DIN 3793–2, Dust Emission of Industrial Origin, Analyzing the Emission of Airborne Noxious Substances, .Part 2: Concentration Parameters of the Air–contaminating Material from Steadily Operated Wood–Processing Machines, Nov. 1997 (english Translation).

*Primary Examiner*—Ed Tolan

(57) ABSTRACT

A shaping machine has at least one rotatably driven spindle having a conical receiving opening. A tool is provided. A conical member is mounted in the receiving opening, wherein the tool is secured by the concial member to the spindle. A clamping device clamps the conical member in the receiving opening, wherein the tool is supported on an end face of the spindle.

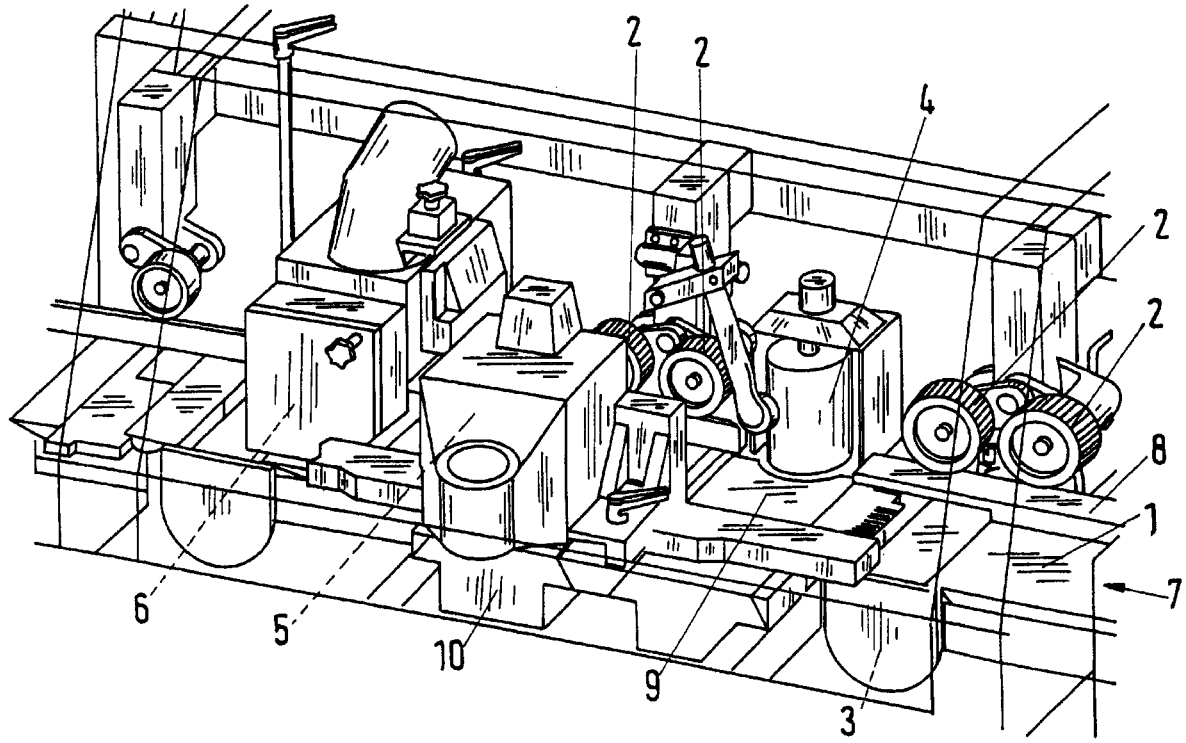

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–15 are determined to be patentable as amended.

1. A [shaping] *molding* machine *for machining a plurality of sides of a workpiece made of wood or plastic in a continuous process*, comprising:
   [at least one] rotatably driven spindle*s* (18);
   *at least one of* said spindle*s* (18) having a conical receiving opening (21);
   a [tool] *plurality of tools* (14a, 24), *each of said tools mounted on a respective one of said spindles, and wherein each of said tools machines different sides of the workpiece*;
   a conical member (25) connected to *each of* said tool*s* (14a, 24) and mounted in said receiving opening (21), wherein *each of* said tool*s* (14a, 24) is secured by said conical member (25) to said spindle (18);
   a clamping device (23) clamping said conical member (25) in said receiving opening (21), wherein *each of* said tool*s* (14a, 24) is supported on an end face (27) of *one of* said spindle*s* (18).

2. A [shaping] *molding* machine according to claim 1, wherein said receiving opening (21) is a hollow shaft conical receiver.

3. A [shaping] *molding* machine according to claim 1, wherein said conical member (25) is a hollow shaft cone.

4. A [shaping] *molding* machine according to claim 1, wherein said conical member (25) is a part of said tool (14a, 24).

5. A [shaping] *molding* machine according to claim 4, wherein said conical member (25) and said tool (14a, 24) are a monolithic part.

6. A [shaping] *molding* machine according to claim 1, wherein:
   said spindle (18) has a spindle journal (12a);
   said conical member (25) is connected to said spindle journal (12a); and
   said tool (14a, 24) is seated in said spindle journal (12a).

7. A [shaping] *molding* machine according to claim 6, wherein said spindle journal (12a) has a collar (26, 26a) so that said tool (14a, 24) seated on said spindle journal (12a) is supported by said collar at said end face of said spindle (18).

8. A [shaping] *molding* machine according to claim 7, wherein said spindle journal (12a) and said collar (26) are a monolithic part.

9. A [shaping] *molding* machine according to claim 1, wherein said tool (24) has a collar (26) and wherein said collar (26) of said tool (24) rests on said end face of said spindle (18).

10. A [shaping] *molding* machine according to claim 9, wherein said tool (24) and said collar (26) are a monolithic part.

11. A [shaping machine according to claim 1, further comprising] *molding machine comprising:*
    *at least one rotatably driven spindle (18);*
    *said spindle (18) having a conical receiving opening (21);*
    *a tool (14a, 24);*
    *a conical member (25) connected to said tool (14a, 24) and mounted in said receiving opening (21), wherein said tool (14a, 24) is secured by said conical member (25) to said spindle (18);*
    *a clamping device (23) clamping said conical member (25) in said receiving opening (21), wherein said tool (14a, 24) is supported on an end face (27) of said spindle (18); and*
    a sleeve (19), wherein said spindle (18) is rotatably supported in said sleeve (19).

12. A [shaping machine according to claim 1, further comprising] *molding machine comprising:*
    *at least one rotatably driven spindle (18);*
    *said spindle (18) having a conical receiving opening (21);*
    *a tool (14a, 24);*
    *a conical member (25) connected to said tool (14a, 24) and mounted in said receiving opening (21), wherein said tool (14a, 24) is secured by said conical member (25) to said spindle (18);*
    *a clamping device (23) clamping said conical member (25) in said receiving opening (21), wherein said tool (14a, 24) is supported on an end face (27) of said spindle (18); and*
    a reading head (30) and a transponder (29), wherein said transponder (29) is mounted on said tool (14a, 24) and transmits tool specifications to said reading head (30).

13. A [shaping] *molding* machine according to claim 12, wherein said reading head (30) is mounted on said spindle (18).

14. A [shaping] *molding* machine according to claim 12, further comprising a control unit, wherein said reading head (30) is connected to said control unit.

15. A [shaping machine according to claim 1,] *molding machine comprising:*
    *at least one rotatably driven spindle (18);*
    *said spindle (18) having a conical receiving opening (21);*
    *a tool (14a, 24);*
    *a conical member (25) connected to said tool (14a, 24) and mounted in said receiving opening (21), wherein said tool (14a, 24) is secured by said conical member (25) to said spindle (18);*
    *a clamping device (23) clamping said conical member (25) in said receiving opening (21), wherein said tool (14a, 24) is supported on an end face (27) of said spindle (18)* wherein said tool (14a, 24) is designed for dressing.

* * * * *